Feb. 23, 1954 J. E. WILLIAMS 2,670,410

DIFFERENTIAL ELECTRONIC AMPLIFIER

Original Filed March 11, 1946

6 Sheets-Sheet 1

INVENTOR

JOHN E. WILLIAMS

BY [signature] [signature]

ATTORNEYS

Feb. 23, 1954

J. E. WILLIAMS 2,670,410

DIFFERENTIAL ELECTRONIC AMPLIFIER

Original Filed March 11, 1946

6 Sheets-Sheet 2

INVENTOR
JOHN E. WILLIAMS

BY [signatures]

ATTORNEYS

INVENTOR
JOHN E. WILLIAMS
BY [signature] [signature]
ATTORNEYS

Feb. 23, 1954 J. E. WILLIAMS 2,670,410

DIFFERENTIAL ELECTRONIC AMPLIFIER

Original Filed March 11, 1946 6 Sheets-Sheet 4

INVENTOR

JOHN E. WILLIAMS

BY A. A. Helvestine
George Sipkin

ATTORNEYS

DIFFERENTIAL ELECTRONIC AMPLIFIER

Original Filed March 11, 1946 6 Sheets-Sheet 5

INVENTOR
JOHN E. WILLIAMS
BY George Sipkin
ATTORNEYS

INVENTOR
JOHN E. WILLIAMS
BY A. W. Helmestine
George Sipkin
ATTORNEYS

Patented Feb. 23, 1954

2,670,410

UNITED STATES PATENT OFFICE 2,670,410

DIFFERENTIAL ELECTRONIC AMPLIFIER

John E. Williams, Linwood, N. J.

Original application March 11, 1946, Serial No. 653,694, now Patent No. 2,579,528, dated December 25, 1951. Divided and this application August 2, 1951, Serial No. 240,024

4 Claims. (Cl. 179—171)

(Granted under Title 35, U. S. Code (1952), sec. 266)

My invention relates broadly to differential electronic amplifiers.

The present case is a divisional application of Serial No. 653,694, filed 11 March, 1946, now Patent No. 2,579,528, issued December 25, 1951.

One of the objects of my invention is to provide means for amplifying variable electric voltage or current, over a broad range of frequencies, in a differential electronic amplifier.

Another object of my invention is to provide means for amplifying variable electric voltage or current, over a broad range of frequencies including zero cycles per second, in a differential electronic amplifier.

Another object of my invention is to provide means for attaining high gain amplification of variable electric voltage or current, over a broad range of frequencies, in a cascaded differential electronic amplifier.

Another object of my invention is to provide means for attaining high gain amplification of variable electric voltage or current, over a broad range of frequencies including zero cycles per second, in a cascaded differential electronic amplifier.

Another object of my invention is to provide means for obtaining amplification of variable electric voltage or current, over a broad range of frequencies, in a push-pull-differential electronic amplifier.

Another object of my invention is to provide means for obtaining amplification of variable electric voltage or current, over a broad range of frequencies including zero cycles per second, a push-pull-differential electronic amplifier.

Another object of my invention is to provide means for obtaining high gain amplification of variable electric voltage or current, over a broad range of frequencies, in a cascaded push-pull-differential electronic amplifier.

Another object of my invention is to provide means for obtaining high gain amplification of variable electric voltage or current, over a broad range of frequencies including zero cycles per second, in a cascaded push-pull-differential electronic amplifier.

Another object of my invention is to provide means for converting "single-sided" amplification to "push-pull" amplification wth controlled exact phase relations in a differential electronic amplifier.

Another object of my invention is to provide means for exciting a pluralty of independent outputs by a single source in a differential electronic amplifier.

Another object of my invention is to provide means for attaining substantially distortionless amplication over a broad band of frequencies in a differential electronic amplifier.

Another object of my invention is to provide means for obtaining substantially distortionless amplification over a broad band of frequencies including high-gain "direct-current" amplification in a differential electronic amplifier, in which the term "direct-current" includes the specialized case of direct resistance coupling.

Another object of my invention is to provide means, in a specialized direct-resistance-coupled application of a differential electronic amplifier, for attaining stable, substantially distortionless amplification at high-gain, at low-noise level, and independent of a critical choice of vacuum tubes.

Other and further objects of my invention will be understood from the specification hereinafter following by reference to the accompanying drawings in which:

Figure 1 shows a means for amplifying variable electric voltage or current in a differential electronic amplifier.

Figure 2 in combination with Figure 1 shows a means for distortionless amplification of variable voltage or current in a differential amplifier.

Within the prior art, and briefly stated, difficulty has been experienced in the design and construction of broad-band electronic amplifiers resulting from the following limitations;

(a) In normal electronic amplification non-linearity exists in varying degree in the dynamic load impedance of vacuum tubes.

(b) The variable impedance of inductive elements, as frequency is varied, results in distortion and in inability effectively to employ direct impedance coupling or transformer coupling at very low frequencies approaching and including zero cycles per second.

(c) The effect of distributed capacitance associated with inductive coupling substantially limits band width.

(d) In normal amplification where capacitance and resistance are associated in coupling amplification stages, both distortion and phase shift substantially exist at very low frequencies, and coupling ceases to be effective at zero cycles per second.

(e) In so-called direct-current amplifiers critical choice of tubes has been essential to the accomplishment of high-gain in a cascade of stages. This has resulted from the biasing voltages which are developed in the coupling resistance and which tend to block the succeeding stage unless critical tube choice provides accommodation of increasingly greater "rest-bias" grid voltages.

(f) In so-called direct current amplifiers, where change in tube type has been avoided, complex circuit requirements have been introduced either to shift cathode voltage or to provide a battery component of voltage in the grid circuit at high potential with respect to cathode and in opposition to the voltage drop developed in the coupling resistor.

My invention is best described by explanations of typical electronic circuits set forth below. In these descriptions I do not limit my invention to the specific circuits, electronic tubes, voltages, type of power or voltage supply, or application shown. I do, rather, consider my invention as a broad application of the general principles and circuits described, as capable of operation with various combinations of presently available circuit elements and electronic tubes and as capable of operation incident to such improvement in circuit elements, electronic tubes, and combinations of circuit elements and electronic tubes as the art may later provide.

Figure 1:
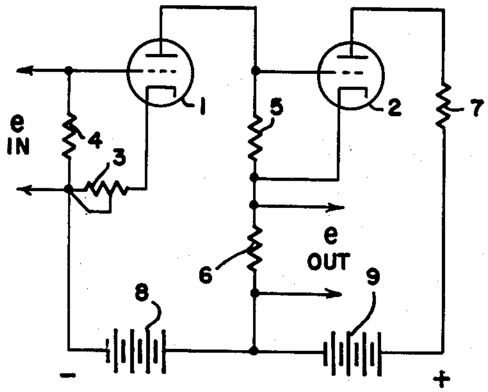

A typical stage of differential electronic amplification is shown in Figure 1, where reference character 1 indicates an input electronic tube including conventional means for providing and controlling electron emission, reference character 2 indicates a differential follower electronic tube similarly including conventional means for providing and controlling electron emission, circuit element 3 indicates suitable control of grid-bias voltage of the input tube, circuit element 4 indicates a suitable means for impressing a variable input voltage or current on the grid-cathode of the input tube, circuit element 5 indicates a suitable means for control of grid-cathode voltage of the differential follower tube, circuit element 6 indicates a suitable means for utilizing the amplified output of a typical elementary stage of differential electronic amplification, circuit element 7 represents suitable means for balancing the dynamic plate load impedances of the input tube and the differential follower tube, and circuit elements 8 and 9 represent a suitable supply of voltage and power. In further explanation of Fig. 1, reference is had to Fig. 2 setting forth in a conventional manner the average plate characteristics of a typical electronic tube, conveniently but not restrictively chosen for observation of the operation of the typical circuit of Fig. 1 and where the loadline AB conveniently represents a dynamic plate load impedance approximating 75,000 ohms and a ratio of plate current change to exciting grid voltage approximating 0.0005 ampere per volt change in grid voltage, where the point C represents a convenient value of grid voltage corresponding to the unexcited condition, and where inequality exists between the dimensions FD and GE indicating a source of distortion in presently employed normal stages of amplification, and is predicated on the point C representing a value of grid voltage midway between the values of grid voltage at points D and E.

With the foregoing in mind, I have observed, and it will be obvious to those versed in the art, that the following sequence of events occurs in the typical circuit of Fig. 1.

(a) With suitably chosen values of circuit elements 3 and 5, the plate currents of circuit elements 1 and 2 can be made equal and with consequent zero current in circuit element 6. Let this condition be considered the optimum rest-condition of a typical differential amplification stage.

(b) A variable voltage impressed across or variable current caused to flow through circuit element 4 results in a linearly related change of grid-cathode voltage of the input tube and in a substantially linearly related change in plate current of the input tube, circuit element 1.

(c) The change in plate current of the input tube results in a change of voltage across circuit element 5 which, viewed as the input grid-cathode voltage of the differential follower tube, circuit element 2, is, under optimum conditions, equal in magnitude and exactly 180 degrees out of phase with the grid-cathode voltage actuating circuit element 1.

(d) Incident to the foregoing, a differential change in current results in circuit element 6 linearly related to the signal voltage or signal current impressed on the input tube and in phase with the input voltage impressed on the input tube.

(e) The differential current flowing in the differential load element, circuit element 6, constitutes substantial differential amplification of the input signal, and can, under the optimum condition of resistanceless bias of the input tube, be made to approach and approximate numerical equality with the amplification constant of the input tube. The amplified signal is conveniently available for the excitation of succeeding stages, or for useful employment as desired.

(f) Any tendency toward instability is opposed and overcome in the typical stage by either or both of the following provisions:

(1) The voltage drop in circuit element 6 consequent on instability opposes and overcomes unstable drift of the grid voltage of the input tube.

(2) The voltage change in resistance self-bias of the grid of the input tube, when cathode self-bias of various forms is employed, inherently opposes unstable drift of grid voltage.

(*g*) Background noise substantially results in conventional single-sided amplifiers from thermal agitation and random uncontrolled transit of electrons in associated electronic tubes. In the typical stage of direct current differential amplification of Fig. 1, substantial portions of this random electron transit occur simultaneously in the two differentially associated electronic tubes and effect cancellation in the differential load element, circuit element 6, with consequent inherently high gain at low-noise level.

Figure 2:
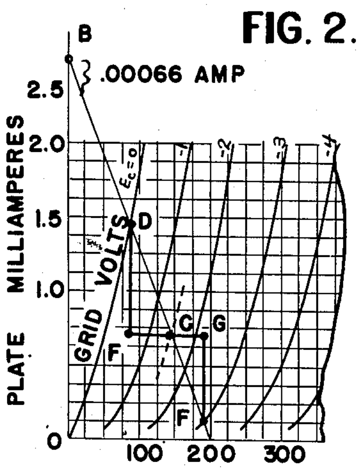

(*h*) With combined reference to Fig. 1 and Fig. 2, the amplifying action of a conventional electronic tube as biased and excited for "Class A" amplification is considered by the art as linear for small signals. In Fig. 2 and by inspection of the dimensions $\overline{FD}$ and $\overline{GE}$, it is obvious that inequality exists in the magnitudes of change in plate current in the positive and negative sense when large sinusoidal signals are impressed on the grid of an electronic tube suitably biased for Class A amplification. This constitutes distortion in conventional amplification. In the operation of the typical differential electronic amplifier, Fig. 1, similar disproportion in excursions of plate current to the input tube are inherently compensated by consequent changes in grid voltage of the differential follower tube, restoring linearity and resulting in distortionless amplification.

(*i*) Under the optimum condition of employing pure resistance in the circuit elements of Fig. 1, independence from the effects of frequency on the amplitude of amplification exists in the typical differential electronic amplifier stage of Fig. 1.

(*j*) Where a condition of operation is desired or exists, based other than on the optimum unexcited rest-condition of the associated electronic tubes, and where the excursions of input signals remain within the capabilities of the electronic tubes employed, the variation of differential current in the differential load element remains linear with respect to the input signal. This fact is novel and contributes to the successful employment of my invention in precision measurements and to increase in gain by reduction of losses in biasing provisions where power conversion applications are desired in a plurality of cascaded stages.

The general art requires, and has not previously had available, a stable, high-gain, low-noise level, distortionless differential electronic amplifier, independent of frequency when desired, not critical as to choice of electronic tubes, not unduly critical as to power supply, not unduly sensitive to the effects of stray electric and magnetic fields, not unduly critical as to adjustment, capable of incorporating compensation for the effects of the capacitance of the electronic tube elements employed and for the effects of the distributed capacitance of associated circuit elements, capable of incorporating frequency-discriminatory filters as desired, capable of conveniently matching the impedance of input and output circuits, and capable of incorporating methods for simultaneously exciting a plurality of output circuits.

Figure 3:
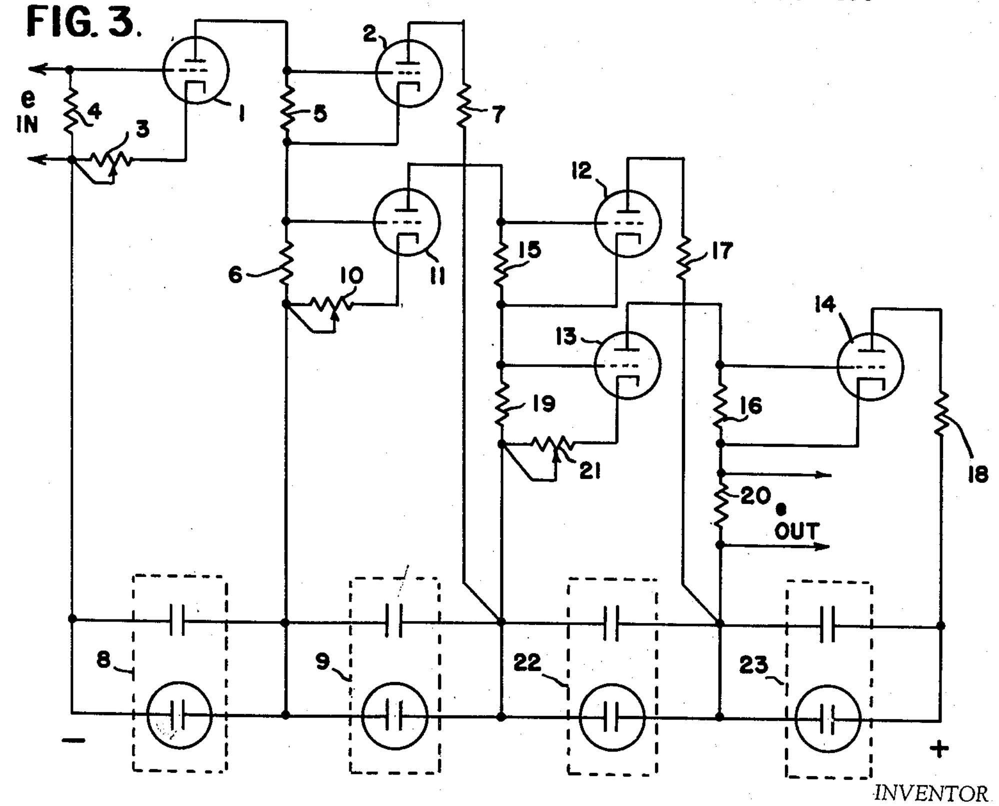
Figure 3 shows a means for cascading stages of amplification in a differential electronic amplifier.

Fig. 3 represents a typical method for cascading the amplification of a plurality of typical elementary differential electronic amplifier stages in a high-gain amplifier and where circuit symbols 1, 2, 3, 4, 5, 6, 7 represent circuit elements similar to and performing the same functions as described for the same notations of Fig. 1, circuit elements 11, 12, 13, 14 represent electronic tubes including conventional provisions for emission and control of electrons, circuit elements 10 and 21 represent suitable methods for providing proper rest-bias respectively for the associated tubes 11 and 13, circuit elements 15 and 16 represent suitable methods for providing essential grid control of their respective differential follower tubes 12 and 14, circuit elements 17 and 18 represent suitable methods for accomplishing functions similar to those described for circuit element 7, circuit element 6 indicates a suitable method for simultaneously performing the functions of differential load impedance for the output of the first differential stage and the input impedance of the second differential stage, circuit element 19 similarly indicates a suitable method for simultaneously performing the functions of differential load impedance of the second differential stage and the input impedance of the third differential stage, circuit element 20 indicates a suitable method for combining the functions of differential load impedance of the third differential stage and of connecting the final stage to the desired electronic application, circuit elements 8, 9, 22, 23 represent suitable provision of power supply regulated, filtered and potentially divided as desired.

With reference to Fig. 3, and to the previous descriptions of Fig. 1 and Fig. 2, I have observed, and it will be obvious to those versed in the art;

(*a*) That cascading the amplification of a plurality of typical stages of differential electronic amplification is effectively accomplished by simultaneously combining in a suitable circuit element the functions of differential load impedance of a preceding stage and the functions of input impedance of a following stage.

(*b*) That where the essential circuit impedances are restricted to pure resistance, independence of frequency exists from zero cycles to values of frequency exceeding 20,000 cycles.

(*c*) That at overall voltage gains exceeding 10,000 the values of noise-level as observed on a directly connected cathode ray tube and alternately by the agency of a loudspeaker were negligible.

(*d*) That at overall voltage gains exceeding 10,000, and as observed by a calibrated directly connected cathode ray tube, the cascaded stages of amplification when once adjusted, remained in stable adjustment and did not drift with respect to the optimum rest condition for repeated periods of time each exceeding several hours in duration.

(*e*) That at overall voltage gains exceeding 10,000, and as observed by a calibrated directly connected cathode ray tube deliberate departure from the optimum rest condition could be introduced in one stage with compensating adjustment made in a following stage, and, within the capabilities of the vacuum tubes employed, the overall amplification remained linear.

(*f*) That at overall voltage gains of 10,000, and as observed by a directly connected calibrated cathode ray tube and as further observed by a loudspeaker, stray magnetic fields could be brought to within approximately one foot of the unshielded amplifier without noticeable reaction.

Various methods have been employed by the art to convert single-sided amplification to push-pull amplification. Where transformers are employed, expensive construction is involved, independence of frequency is difficult to attain and susceptibility to stray magnetic fields is present. Where combinations of capacitance and resistance are utilized to produce the conversion, uncontrolled phase shift occurs as a function of frequency.

Figure 4:
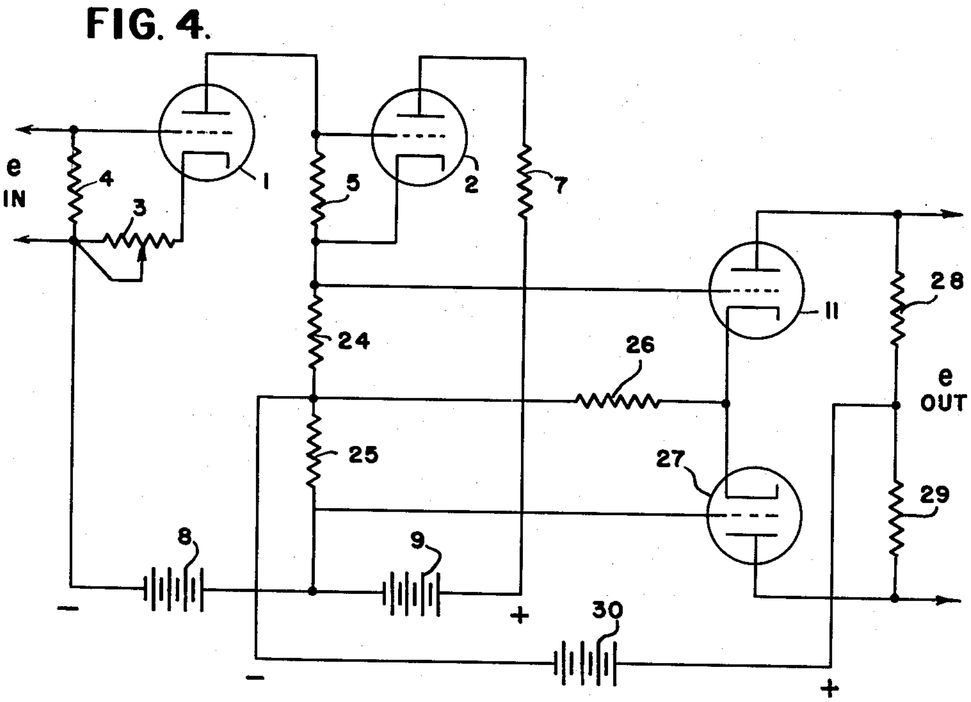
Figure 4 shows a means for converting single-sided amplification to push-pull amplification with exact phase relations in a differential electronic amplifier.
Figure 5:
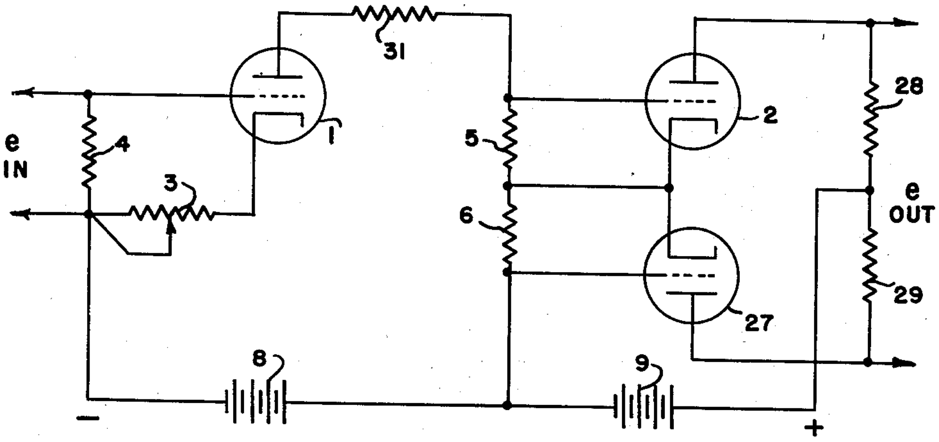
Figure 5 shows an alternate means for converting single-sided amplification to push-pull amplification with exact phase relations in a differential electronic amplifier.

Figures 4 and 5 represent typical differential electronic amplifiers, converting single-sided amplification to push-pull amplification, where circuit elements 1, 2, 3, 4, 5, 6, 7, 8, 9 perform functions similar to those described for the same symbols of Figure 1, circuit elements 11 and 27 represent conventional electronic tubes, together with means for providing and controlling electronic emission, circuit elements 24 and 25 represent two suitable and equal impedances replacing circuit element 6 of Figure 1, circuit element 26 represents a suitable means for biasing circuit elements 11 and 27, circuit elements 28 and 29 represent suitable output impedances for utilizing the push-pull output of vacuum tubes 11 and 27, circuit element 30 represents a suitable power supply, together with such filtering, potential division, and voltage regulation as may be desired, and circuit element 31 represents a suitable means for establishing a desired dynamic plate load impedance in the plate circuit of vacuum tube circuit symbol 1.

With reference to Fig. 4, and to the previous description of Fig. 1, I have observed, and it will be obvious to those versed in the art, that the differential current flowing in the two equal impedances 24 and 25 establishes and impresses on vacuum tubes 11 and 27 correct input voltages with exact phase relations as required for push-pull operation.

With reference to Fig. 5, and to the previous description of Fig. 1, I have observed, and it will be obvious to those versed in the art:

(*a*) That by suitable choice of circuit elements 5, 6, and 31 and in the unexcited condition, the plate currents of vacuum tubes 1, 2, and 27 can be made equal, that the differential relations between the input tube 1 and its differential follower tube 2 are preserved, that vacuum tube 27 will then be self-biased by its own cathode current through circuit element 6 and in an amount equal to the bias impressed on vacuum tube 2.

(*b*) That, when the input tube 1 is excited, current division occurs at the junction of circuit elements 5 and 6 as controlled by the plate current of vacuum tube 1 and in such manner as to provide excitation of vacuum tubes 2 and 27 with exact phase relations and voltage values as required for push-pull operation. Filtering and voltage regulation of the power supply may be made less vigorous by the employment of push-pull differential amplification since in this type of amplification current changes in the power supply leads may substantially be minimized.

Figure 6:
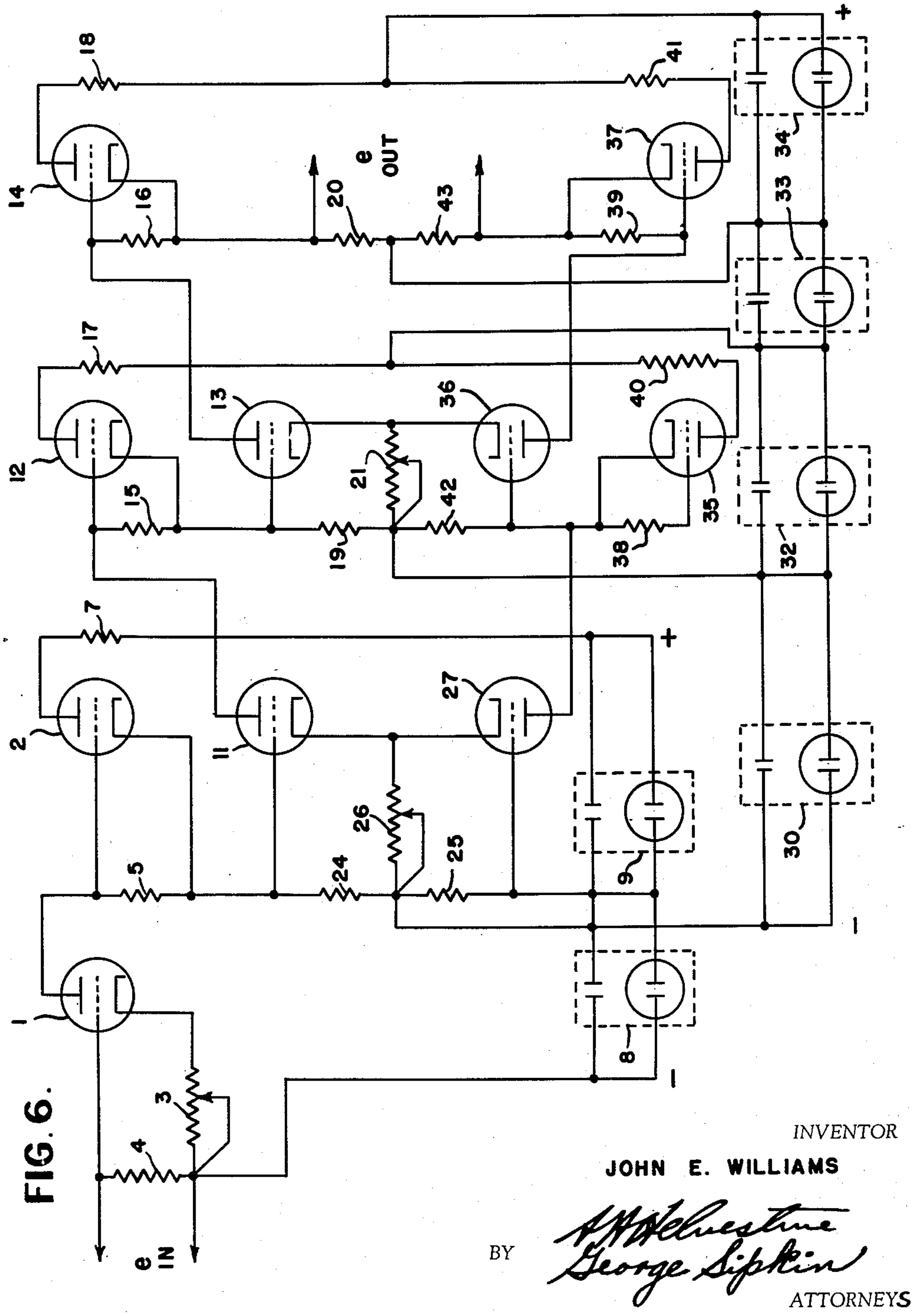
Figure 6 shows a means for cascading push-pull differential amplification.

Fig. 6 shows a typical push-pull differential cascaded amplifier in which circuit elements 1, 2, 3, 4, 5, 6, 7, 8, and 9 represent elements performing the same functions previously described for the same symbols of Fig. 1, circuit elements 11, 12, 13, 14, 15, 16, 17, 18, 19, 20 and 21 perform the same functions as those previously described for the same symbols in Fig. 3, circuit elements 24, 25, 26, 27, 30 perform the same functions as those previously described for the same symbols in Fig. 4, circuit elements 32, 33, 34 represent suitable provision of power supply including filtering, potential division, and voltage regulation as desired, circuit elements 35, 36, 37 represent conventional electronic tubes including means for providing and controlling electron emission, circuit elements 38, 39 represent suitable means for providing control of grid voltage of the associated tubes 35 and 37, circuit elements 40, 41 represent suitable means for balancing the dynamic plate load impedance of the associated tubes 35 and 37, circuit element 42 represents suitable means for providing a differential load impedance for tubes 27 and 35 and mutual to the input of tube 36, circuit element 43 represents suitable means for providing a differential load impedance for tubes 36 and 37 and for utilizing the output of tubes 36 and 37 as desired.

With reference to Fig. 6, and with further reference to previous descriptions of Fig. 1, Fig. 3 and Fig. 4, I have observed, and it will be obvious to those versed in the art, that conversion from single-sided amplification to push-pull amplification and subsequent cascaded high-gain amplification is effectively accomplished in a push-pull differential electronic amplifier.

Figure 7:
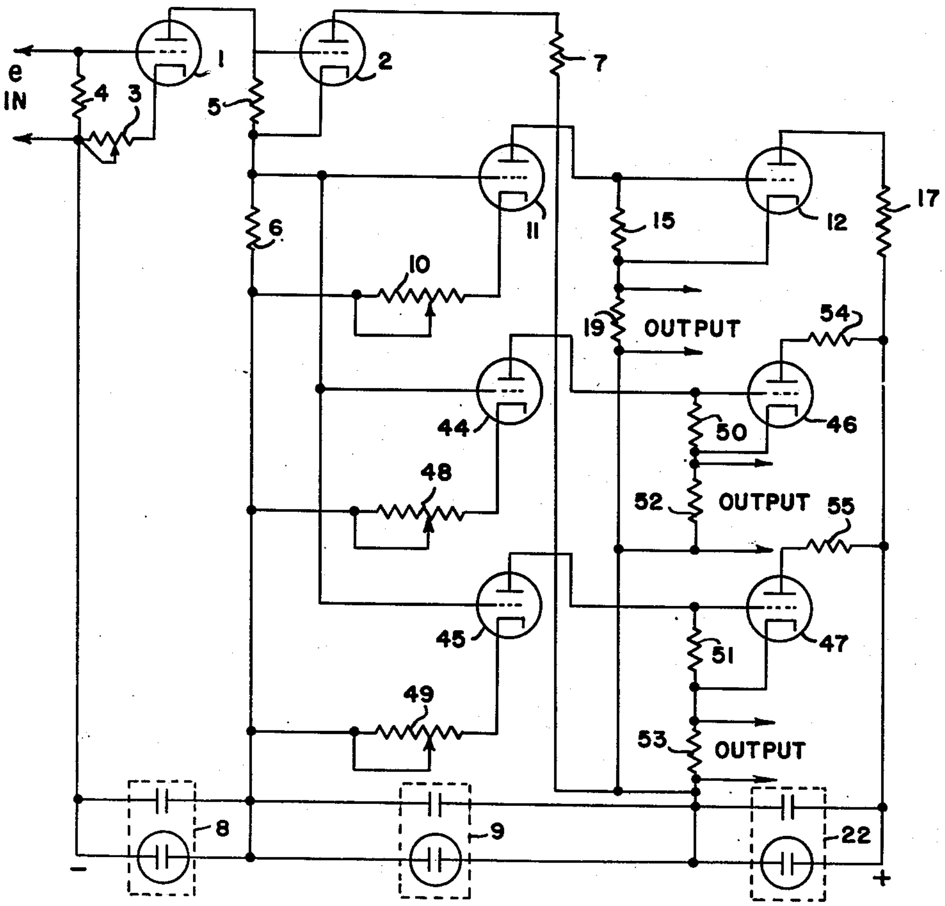
Figure 7 shows a means for simultaneously and independently exciting a plurality of output circuits by a single source in a direct circuit differential electronic amplifier.

Fig. 7 represents a typical direct current differential electronic amplifier converting a single exciting input to a plurality of linearly related outputs, where circuit elements 1, 2, 3, 4, 5, 6, 7, 8, 9 perform functions similar to those described for the same symbols of Fig. 1, and where circuit elements 11, 44, 45 represent suitable electronic input tubes together with conventional means for producing and controlling electron emission, circuit elements 12, 46, 47 represent suitable electronic differential follower tubes together with conventional means for producing and controlling electron emission, circuit elements 10, 48, 49 represent suitable means for biasing the related electronic input tubes, circuit elements 15, 50, 51 represent suitable means for converting the variable plate currents of their associated preceding electronic input tubes to suitable values of grid control voltage of the also associated differential follower tubes, circuit elements 19, 52, 53 represent suitable differential load impedances of their respective related differential circuits, circuit elements 17, 54, 55 represent suitable means for balancing the plate load impedances of their related input tubes and differential follower tubes, circuit elements 8, 9, 22 represent suitable means for filtering, potential division, and regulation of the power supply.

With preceding descriptions in mind and with reference to the typical differential electronic amplifier of Fig. 7, I have observed, and it will be obvious to those versed in the art:

(*a*) That a variable input voltage or current impressed on circuit element 4 produces a linearly related differential current in and voltage across circuit element 6, and further (*b*) That the then existing differential voltage of circuit element 6 is mutual to and simultaneously excites the input tubes of the plurality of circuits shown and produces differential currents in their related differential load impedances respectively circuit elements 19, 52, 53, and further (*c*) That the differential currents of the plurality of output circuits shown are linearly related to and in phase with the input signal voltage impressed on circuit element 4, and further (*d*) That the differential currents in the plurality of output circuits shown are suitably and simultaneously available for useful employment as may be desired.

Under certain operating conditions it may be desirable to incorporate the operating features of multi-grid electronic tubes in a direct current differential amplifier. Two such conditions are cited as examples, but not restrictively:

(a) The power sensitivity of a beam power tube or pentode.

(b) The employment of a screen grid to reduce capacity coupling through the elements of an electronic tube and between a preceding and consequent circuit, particularly at radio frequencies.

Figure 8:
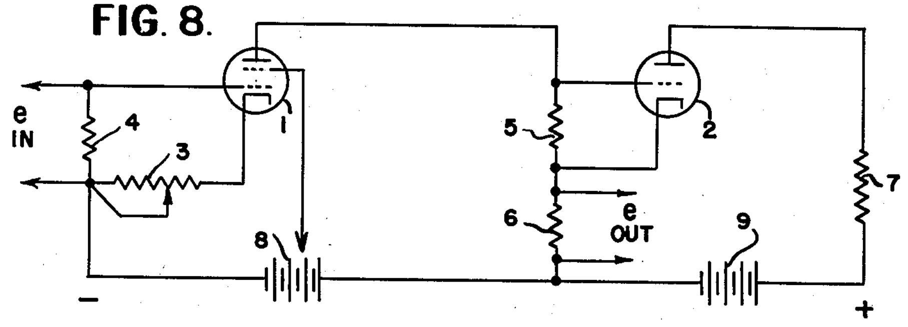
Figure 8 shows a means for associating multi-grid electronic tubes in differential combination with triode followers in a differential electronic amplifier.

Another typical stage of differential amplification is shown in Fig. 8, where a multi-grid electronic tube is associated with a triode, and where circuit elements 1, 2, 3, 4, 5, 6, 7, 8, 9 perform functions similar to those described above for the same symbols of Fig. 1.

With reference to Fig. 8, I have observed, and it will be obvious to those versed in the art:

(a) That by reference to previous descriptions and suitable choice of circuit elements, the plate currents of circuit elements 1 and 2 can be made equal in the optimum unexcited rest condition, and further (b) That excursions in the plate current of circuit element 1, as caused by suitable excitation of that element, result in changes of plate current in circuit element 2 equal in magnitude and opposite in phase to the changes in plate current of circuit element 1, and further (c) That the resulting differential current in the differential load element 6 is linear with respect to and in phase with signal voltage exciting circuit element 1.

Figure 9:
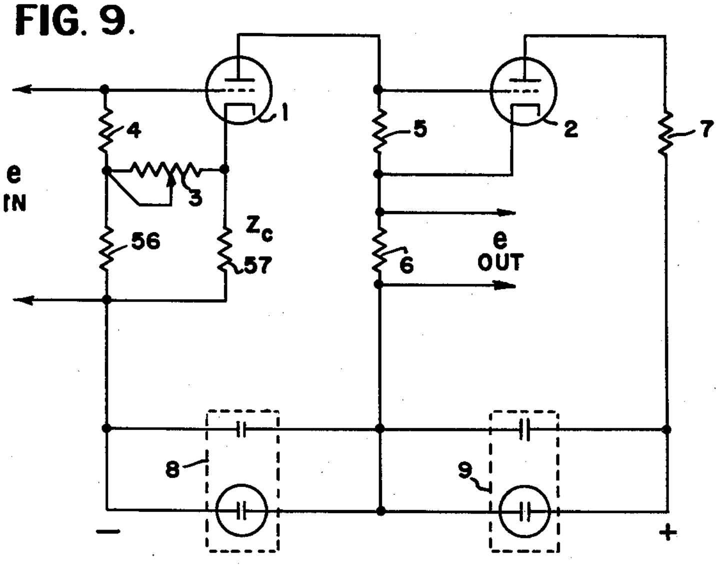
Figure 9 shows a means for combining compensation for the effects of distributed capacitance in a differential electronic amplifier.

Fig. 9 shows a typical stage of direct current differential electronic amplification incorporating compensation where circuit elements 1, 2, 3, 4, 5, 6, 7, 8, 9 perform functions similar to and bear the same notation as those previously described for Fig. 1, and where circuit element 56 preferably, but not restrictively, resistive represents an impedance forming part of the plate impedance of tube 1 but introduced on the cathode side, and circuit element 57 represents a suitable element incorporating controlled frequency discrimination.

With reference to Fig. 9 and as based on previous descriptions herein, I have observed, and it will be obvious to those versed in the art:

(a) That an input variable voltage impressed across circuit elements 4 and 56 as shown results in a portion of that voltage being impressed on and actuating the input tube, circuit element 1, and further (b) That with the impedance of circuit element 57 adjusted to infinity a controlled constant value of degeneration exists in the circuit associated with the input tube and results in a decreased but constant value of amplified voltage across circuit element 6, and further (c) That with the impedance of circuit element 57 adjusted to a suitable finite value and dependent on frequency, a variable but definite control of degeneration is available together with corresponding control of amplification and provides a means for compensating the differential amplifier for the effects of the capacitance associated with the elements of the electronic tubes employed and for the effects of the distributed capacitance of other associated circuit elements and their connections.

Figure 10:
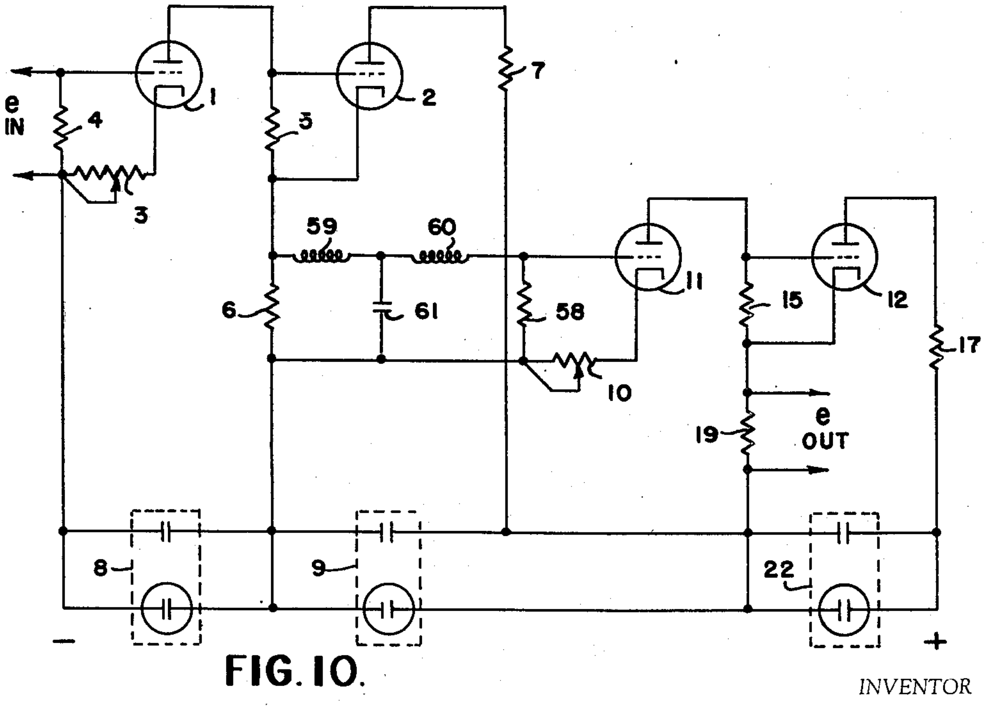
Figure 10 shows a means for combining a low-pass filter with a direct current differential electronic amplifier.

Fig. 10 shows a typical differential electronic amplifier incorporating a typical low-pass filter in which circuit elements 1, 2, 3, 4, 5, 6, 7, 8, 9 perform functions similar to the circuit elements bearing the same symbols in Fig. 1 and previously described, and in which circuit elements 10, 11, 12, 15, 17, 19, 22 perform functions similar to the circuit elements bearing the same symbols in Fig. 3 and previously described, and in which circuit elements 6 and 58 traditionally represent suitable means for connecting the differential load output of the preceding stage to a typical low-pass filter and in turn suitably connecting the output of that filter to the input of the succeeding stage, circuit elements 59, 60, 61 represent suitable values of inductance capacitance and resistance composing a typical low-pass filter.

With reference to Fig. 10, I have observed, and it will be obvious to those versed in the art, that resistive elements 6 and 58, as shown, provide optimum relations for incorporation of a low-pass filter in a differential electronic amplifier.

Figure 11:
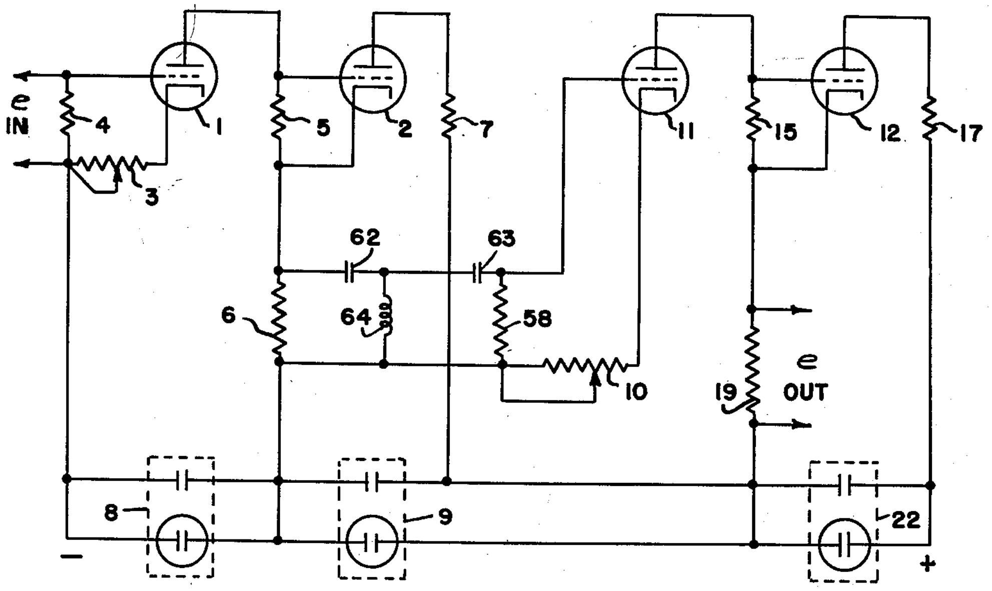
Figure 11 shows a means for combining a high-pass filter with a direct current differential electronic amplifier.

Fig. 11 shows a typical differential electronic amplifier incorporating a high-pass filter in which circuit elements 1, 2, 3, 4, 5, 6, 7, 8, 9, 10, 11, 12, 15, 17, 19, 22, 58 perform functions similar to the circuit elements bearing the same symbols in Fig. 10 and previously described, and in which symbols 62, 63, 64 represent suitable values of capacitance inductance and resistance of a typical high-pass filter.

With reference to Fig. 11, I have observed, and it will be obvious to those versed in the art, that resistive elements 6 and 58, as shown, provide optimum relations for incorporation of a typical high-pass filter in a direct current differential electronic amplifier.

Figure 12:
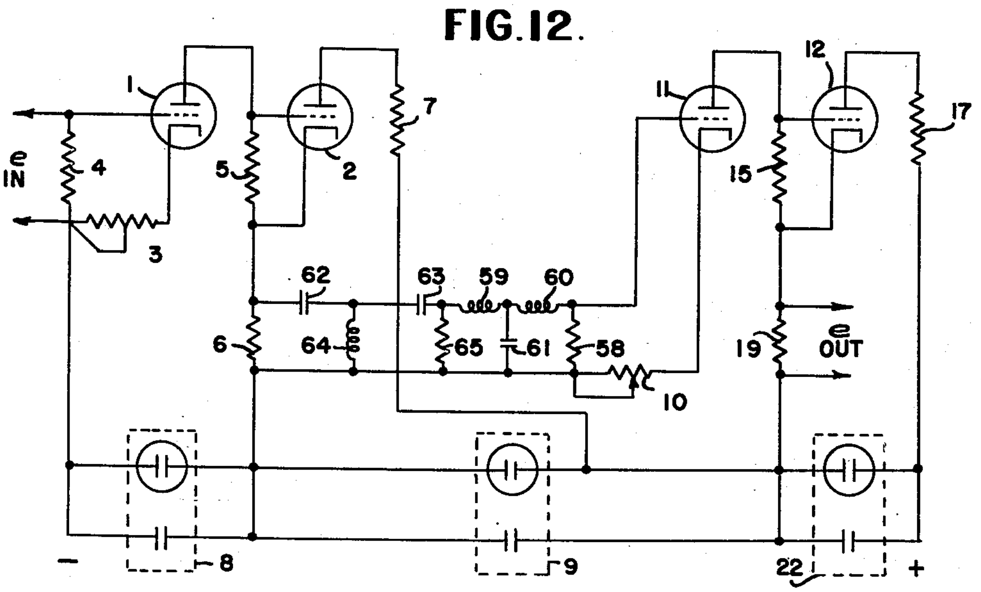
Figure 12 shows a means for combining a band-pass filter with direct current differential electronic amplifier.

Fig. 12 shows a typical differential electronic amplifier incorporating a typical band-pass filter in which circuit elements 1, 2, 3, 4, 5, 6, 7, 8, 9, 10, 11, 12, 15, 17, 19, 22, 58, 59, 60, 61, 62, 63, 64 perform functions similar to those bearing the same notation in Fig. 11 and previously described, and in which circuit element 65 represents a suitable means of providing circuit continuity and matching of sections of the band-pass filter.

With reference to Fig. 12, I have observed, and it will be obvious to those versed in the art, that resistive elements 6 and 58, as shown, provide optimum relations for incorporation of a typical band-pass filter in a direct current differential electronic amplifier.

The invention described herein may be manufactured and used by or for the Government of the United States of America for governmental purposes without the payment of any royalties thereon or therefor.

What I claim is:

1. An electronic amplifier comprising a first circuit containing a first pair of vacuum tubes each having a cathode, an anode, and a control grid, the first of said first pair of vacuum tubes having an impedance input and a self-biasing cathode impedance element, a first impedance element connected to the anode of said first tube, a second impedance element connected to said first impedance element and to a first source of power, the second of said pair of vacuum tubes having its cathode connected to the juncture of said first and second impedance elements and its grid connected to the anode of said first of said first pair of vacuum tubes and an anode impedance interconnecting the anode of said second of said first pair of vacuum tubes and a second source of power, a second circuit containing a second pair of vacuum tubes each having a cathode, an anode, and a control grid, the anode of the first of said second pair of vacuum tubes being connected to a fourth impedance element, a fifth impedance element interconnecting said fourth impedance element and said second source of power, means connecting said control grid of said second of said second pair of vacuum tubes to the anode of the first of said second pair of vacuum tubes and cathode of said second of said second pair of vacuum tubes to the juncture of said fourth and fifth impedance elements, and a second anode resistance interconnecting said anode of the second of said second pair of vacuum tubes to a third source of power, and a frequency responsive coupling circuit coupling the control grid of the first of said second pair of vacuum tubes to the cathode of the second of said first pair of vacuum tubes.

2. The apparatus in claim 1 wherein said frequency responsive coupling circuit is a low-pass filter.

3. The apparatus in claim 1 wherein said frequency responsive coupling circuit is a band-pass filter.

4. The apparatus in claim 1 wherein said frequency responsive coupling circuit is a high-pass filter.

JOHN E. WILLIAMS.

References Cited in the file of this patent

UNITED STATES PATENTS

| Number | Name | Date |
|---|---|---|
| 2,310,342 | Artzt | Feb. 9, 1943 |
| 2,424,893 | Mansford | July 29, 1947 |
| 2,438,960 | Blitz | Apr. 6, 1948 |